United States Patent [19]

Modone et al.

[11] 4,445,918
[45] May 1, 1984

[54] PROCESS AND APPARATUS FOR ON-LINE DEHYDROGENATION OF FIBER-DRAWING PREFORMS

[75] Inventors: Eros Modone, Turin; Giacomo Roba, Cogoleto, both of Italy

[73] Assignee: Cselt Centro Studi E Laboratori Telecomunicazioni S.p.A., Turin, Italy

[21] Appl. No.: 390,801

[22] Filed: Jun. 21, 1982

[30] Foreign Application Priority Data

Jun. 22, 1981 [IT] Italy .............................. 67857 A/81

[51] Int. Cl.³ ............................................. C03B 37/07
[52] U.S. Cl. ...................................... 65/3.12; 65/157; 65/374.12
[58] Field of Search .................... 65/3.12, 157, 374.12; 427/163

[56] References Cited

U.S. PATENT DOCUMENTS 3,791,714  2/1974  Maurer .......................... 65/3.12 X
3,826,560  7/1974  Schultz .......................... 65/3.12 X
3,865,647  2/1975  Reuschel ....................... 65/3.12 X

FOREIGN PATENT DOCUMENTS 54-48256  4/1979  Japan .................................. 65/3.12

OTHER PUBLICATIONS

Kato et al, "Isotopic Chemical Vapor Deposition...", Applied Optics, vol. 16, No. 6, Jun. 1977, pp. 1453–1454.

Primary Examiner—Richard V. Fisher
Attorney, Agent, or Firm—Karl F. Ross

[57] ABSTRACT

Vapor deposition of doped silica in a reaction chamber on a rotating supporting surface, in the manufacture of a preform for the drawing of an optical fiber, is accompanied by the continuous admixture of deuterium with a flow of carrier gas, specifically oxygen, by which the reactants are transported to the reaction chamber. An isotopic substitution of deuterium for the hydrogen of hydroxyl groups in the reaction products shifts the major absorption peaks to wavelengths outside the minimum-attenuation range of 0.7 to $1.6\mu$ used for fiber-optical signaling. The proper ratio of deuterium to carrier gas is maintained with the aid of a mixer having two compartments separated by a perforated diaphragm or a thin metallic foil, one compartment being connected to a deuterium tank while the other communicates with a conduit through which the vapors entrained by the carrier gas pass to the reaction chamber.

11 Claims, 2 Drawing Figures

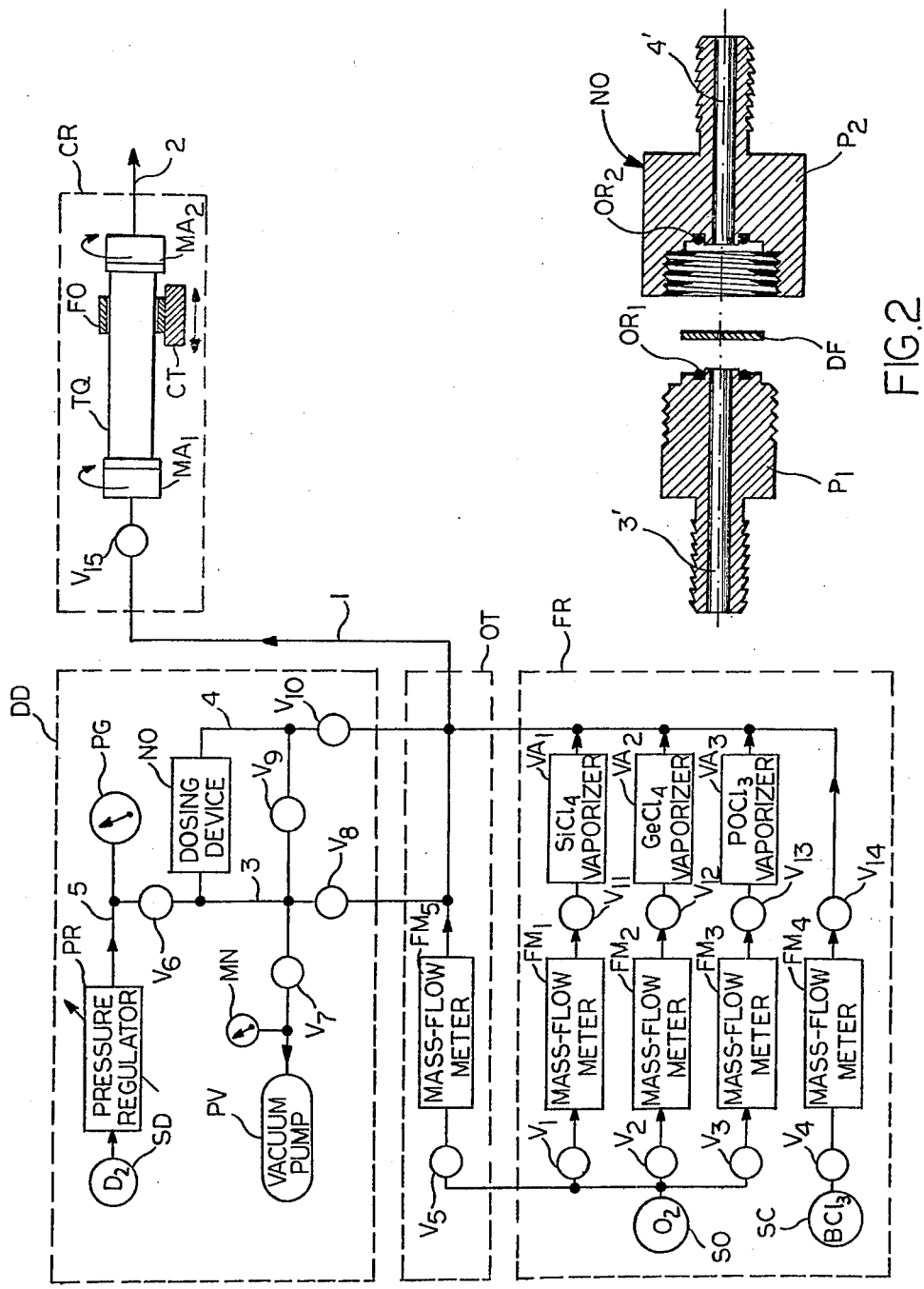

PROCESS AND APPARATUS FOR ON-LINE DEHYDROGENATION OF FIBER-DRAWING PREFORMS

CROSS-REFERENCE TO RELATED APPLICATION

This application contains subject matter disclosed in our copending application Ser. No. 273,423 filed June 15, 1981, now U.S. Pat. No. 4,389,230.

FIELD OF THE INVENTION

Our present invention relates to a process for manufacturing fiber-drawing preforms of reduced hydrogen content as well as an apparatus for carrying out this process.

BACKGROUND OF THE INVENTION

The transmission of message signals over optical fibers, made from doped silica, advantageously utilizes a minimum-attenuation window in a range between $0.7$ and $1.6\mu$; within that range, however, there are known to exist two absorption peaks due to the presence of hydroxyl groups in the fiber material. When fibers are drawn from a preform produced by the well-known MCVD (modified chemical-vapor deposition) technique on a substrate such as a rotating glass tube, $OH^-$ groups can be picked up by diffusion into the fiber material from the substrate at the elevated treatment temperatures as explained in our copending application and patent. Such hydroxyl ions, however, result also from hydrogen occurring in elemental or compound form in the reactants used for making the preform. Thus, for example, trichlorosilane ($SiHCl_3$) may react with oxygen—normally used as a carrier gas for the reactants—to establish hydrogen-oxygen bonds inside the silica matrix during the deposition phase. The H—O bonds oscillate at a fundamental frequency with a wavelength of $2.8\mu$ whose second and third harmonics lie within the aforementioned range and thus give rise to the two absorption peaks in the minimum-attenuation window.

In our above-identified prior patent we have disclosed a process for improving the transmission characteristics of optical fibers drawn from preforms by subjecting the preform-supporting wall surface of a rotation glass tube to a two-stage heat treatment with deuterium whereby $OH^-$ groups in the tube material are isotopically replaced by $OD^-$ groups. This operation, performed in a pretreatment phase preceding the actual deposition of fiber material on the tube surface, also causes an isotopic substitution of deuterium atoms for hydrogen atoms in the subsequently produced preform, particularly in layers thereof close to that surface.

U.S. Pat. No. 3,791,714 describes a process for making glass for optical waveguides, i.e. for preforms from which fibers can be drawn, by passing deuterium through a liquid glass-forming compound (silicon tetrachloride plus titanium tetrachloride) and generating a gaseous mixture which is introduced into an oxygen flow for deposition upon a rotating mandrel. A process is also known for producing low-loss glass by isotopic chemical-vapor deposition (ICVD) involving a direct reaction of $SiCl_4$ and other chlorides with deuterium oxide; see article by D. Kato et al in Applied Optics, Vol. 16, No. 6, June 1977, pages 1453 and 1454. These known processes presuppose the absence of hydrogen-containing contaminants from the starting materials which therefore would have to undergo prior purification by a conventional method such as distillation, sublimation, filtering or the use of photochemically activated chlorine. Since the reactants in that instance must have a very high degree of purity, generally to within $10^{-5}\%$, their handling during such pretreatment requires extreme care. As a separate processing operation, moreover, such a purification treatment retards the manufacture of the preform.

OBJECTS OF THE INVENTION

An important object of our present invention, therefore, is to provide an on-line process for an effective dehydrogenation of fiber-drawing preforms to be carried out in a continuous manner during the production of such preforms from not specially purified vitreous material. A related object is to provide an apparatus having means for carrying out such dehydrogenation in a precisely controlled manner.

SUMMARY OF THE INVENTION

The process according to our invention involves the usual step of continuously entrained vapors of silicon compounds and doping agents by a flow of carrier gas, specifically oxygen, to a high-temperature reaction chamber for deposition on a substrate by the MCVD technique already referred to. Deuterium is continuously admixed with this flow of carrier gas at a controlled rate sufficient to replace a significant amount of hydrogen atoms by deuterium atoms in a deposit of doped silica formed on a substrate in that chamber, such as a surface of a rotating glass tube as described in our prior patent. That glass tube, of course, may have been pretreated with deuterium in the manner disclosed in that patent.

Pursuant to another feature of our invention, the rate of admixture of deuterium with the flow of reactant-entraining carrier gas is controlled by dosing means comprising a housing with a first compartment open to a source of deuterium under pressure, such as a storage tank, and with a second compartment communicating with a conduit traversed by the carrier gas. The two compartments are separated from each other by a gas-permeable partition which may comprise a diaphragm with a narrow orifice or a thin membrane, preferably a metallic foil. A suitable material for such a membrane is palladium, either alone or alloyed with silver.

BRIEF DESCRIPTION OF THE DRAWING

The above and other features of our invention will now be described in detail with reference to the accompanying drawing in which:

FIG. 1 is a block diagram of an apparatus for the on-line dehydrogenation of fiber-drawing preforms in accordance with our invention; and FIG. 2 is an exploded longitudinal sectional view of a dosing device forming part of the apparatus of FIG. 1.

SPECIFIC DESCRIPTION

The basic constituents of the apparatus shown in FIG. 1 are a reaction chamber CR, an assembly FR for the controlled continuous supply of reactants, a unit OT for controlling the flow of oxygen used as both a reactant and a carrier gas, and an assembly DD for the controlled admixture of deuterium with that carrier gas on its way to the reaction chamber CR.

Assembly FR comprises a storage tank SO for oxygen under pressure, a similar storage tank SC containing a gaseous doping agent such as boron chloride $BCl_3$, and several vaporizers $VA_1$–$VA_3$ in which other reactants such as silicon chloride $SiCl_4$, germanium chloride $GeCl_4$ and phosphorus oxychloride $POCl_3$ are stored. Their vapors can be selectively entrained by oxygen from tank SO, at rates measured by mass-flow meters $FM_1$–$FM_3$, under the control of valves $V_1$–$V_3$ and $V_{11}$–$V_{13}$ upstream and downstream of these flow meters. Similar valves $V_4$ and $V_{14}$ upstream and downstream of a mass-flow meter $FM_4$ serve for the controlled addition of the contents of tank SC to the oxygen flow which passes through a conduit 1 to an inlet valve $V_{15}$ of reaction chamber CR. The latter comprises a pair of chucks $MA_1$, $MA_2$, rotated by a nonillustrated motor, to which a glass tube TQ serving as a preform support or core is clamped, substantially as described in our prior patent. An annular heater or ring furnace FO surrounds the tube TQ and is axially reciprocable therealong by a carriage CT for heating same to the required operating temperature as the reactant-laden oxygen stream enters the tube through valve $V_{15}$, with most of the oxygen leaving by an outlet 2.

Some of the oxygen from tank SO also passes directly to conduit 1 by way of a control valve $V_5$ and a mass-flow meter $FM_5$ forming part of unit OT. Two parallel branches 3 and 4 of conduit 1, downstream of flow meter $FM_5$, lead to opposite ends of a dosing device NO in assembly DD and are provided with respective control valves $V_8$ and $V_{10}$. Assembly DD further includes a rotary vacuum pump PV, connected via a valve $V_7$ to conduit 3, and a deuterium-storing tank SD connected by way of a pressure regulator PR, a conduit 5 and a valve $V_6$ to conduit 3 and thus to the left-hand end of device NO. The two branch conduits 3 and 4 are further interconnected, beyond valves $V_8$ and $V_{10}$, by another valve $V_9$ lying in cascade with valve $V_7$ between conduit 4 and vacuum pump PV; the intake end of this pump is joined to a manometer MN while a pressure gauge PG is connected to conduit 5.

Details of dosing device NO have been illustrated in FIG. 2 showing it as comprising a divided housing with a male part $P_1$ and a female part $P_2$ that are threadedly interconnectable and have serrated nipples by which they can be resiliently fitted into branch conduits 3 and 4. Housing parts $P_1$ and $P_2$ have channels 3' and 4', effectively constituting extensions of these branch conduits, which in the assembled position of the device are separated from each other by a deuterium-permeable partition DF clamped between sealing rings $OR_1$ and $OR_2$. Partition DF may be a diaphragm with a narrow central orifice but could also be a thin metallic foil preferably consisting of palladium or a palladium/silver alloy.

Before the start of a preform-producing operation, with only valves $V_7$ and $V_9$ open, vacuum pump PV is operated to exhaust all gas from the channels 3' and 4' of dosing device NO. Thereafter, valve $V_7$ can be closed while valves $V_6$, $V_{10}$ and $V_{15}$ are opened to let deuterium from tank SD flow through the tube TQ for a pretreatment at elevated temperatures as described in our prior patent. Next, valves $V_6$ and $V_9$ are closed whereas valves $V_5$ and $V_8$ are opened to set up a suitable flow rate of carrier gas through tube TQ while establishing a pressure equilibrium in dosing device NO. Finally, with valve $V_8$ closed, the valves of assembly FR—or some of them—are opened for an entrainment of the desired reactants in suitable proportions by the flow of oxygen from tank SO; with valve $V_6$ reopened, deuterium from tank SD is continuously admixed with this gas flow at a rate controlled by pressure regulator PR and by the permeability of partition DF.

The compounds stored in assembly FR, reacting with the carrier oxygen, will give rise to germanium, boron and phosphorus oxides in a silica matrix constituting the developing preform. The isotopic substitution of deuterium for hydrogen in that matrix may involve, for example, a reaction such as

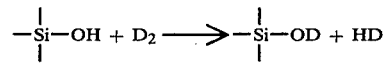

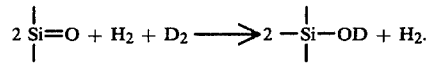

The preferential formation of $OD^-$ groups in lieu of $OH^-$ groups is facilitated by the difference in bonding energy which at 25° C. is 463 KJ/mole for O—H bonds and 469 KJ/mole for O—D bonds.

As noted in our prior patent, the fundamental vibration wavelength of the O—D bond is $3.9\mu$ and thus has a third harmonic which still lies within the minimum-attenuation window of 0.7 to $1.6\mu$; the magnitude of this third harmonic, however, is much lower than that of the second harmonic—by about 90 dB/km/ppm—so that its absorption effect is negligible.

The dosing of the deuterium admixture should take into account the need for avoiding side reactions with other molecules present in the gas flow, e.g. the formation of deuterium chloride. With a deposition rate of, say, 1 mg/sec, the deuterization rate may vary between about 1 and 100 ppmw (parts per million in terms of weight), for example. This corresponds to a $D_2$ flow of at least 1 to 100 ng/sec (assuming 100% reaction efficiency). Since the molar mass of $D_2$ equals 4.0272 g/mole, the deuterium flow should then lie in a range of about $1.5 \cdot 10^{14}$ and $1.5 \cdot 10^{16}$ molecules per second.

With a perforated diaphragm used as the partition DF in FIG. 2, the deuterium flow through device NO is given by $$\phi = \sigma \cdot \Psi$$

where $\sigma$ is the cross-sectional area of the diaphragm orifice and $\Psi$ is the effusion rate. The general formula for that rate is $$\Psi = N\sqrt{\frac{RT}{2\pi M}}$$

where N is the number of molecules per unit of volume, R is the gas constant, M is the molar mass and T represents absolute temperature. For a deuterium pressure of 2050 dynes/cm² and the aforementioned maximum flow rate of $\phi = 1.5 \cdot 10^{16}$ molecules/sec, area $\sigma$ will be $7.85 \cdot 10^{-7}$ cm². This deuterium pressure is added in housing part $P_1$ to the substantially constant oxygen pressure prevailing in housing part $P_2$.

As will be apparent from the foregoing description, our improved process involves the isotopic exchange of hydrogen and deuterium atoms throughout the production of a preform on a substrate by the MCVD technique, in an atmosphere in which such hydrogen atoms are unavoidably present, and not an interaction between deuterium and various compounds in an essentially hydrogen-free environment as known from the prior art discussed above.

We claim:

1. A process for manufacturing fiber-drawing preforms of reduced hydrogen content, comprising the steps of:
   (a) continuously entraining vapors of silicon compounds and doping agents by a flow of carrier gas to a high-temperature reaction chamber for deposition on a substrate;
   (b) establishing a connection between the flow path of said carrier gas and a source of elemental deuterium under pressure for continuously admixing said elemental deuterium with said flow; and
   (c) inserting into said connection a gas-penetrable partition for controlling the rate of admixture to displace significant amounts of hydrogen by deuterium in a deposit of doped silica formed on said substrate.

2. A process as defined in claim 1 wherein the rate of admixture is controlled in step (c) by passing the deuterium through a narrow orifice of said partition.

3. A process as defined in claim 1 wherein the rate of admixture is controlled in step (c) by passing the deuterium through a gas-permeable membrane constituting said partition.

4. A process as defined in claim 1, 2 or 3 wherein said carrier gas is oxygen.

5. An apparatus for manufacturing fiber-drawing preforms of reduced hydrogen content, comprising:
   first supply means for delivering oxygen under pressure;
   vaporizing means for generating vapors of silicon compounds and doping agents to be deposited upon a substrate in a high-temperature reaction chamber;
   first conduit means connecting said first supply means with said reaction chamber by way of said vaporizing means for generating a continuous flow of said vapors entrained by the oxygen to said substrate;
   second supply means for delivering gaseous deuterium under pressure;
   second conduit means extending from said second supply means to said first conduit means for continuously admixing elemental deuterium with said flow of vapors; and
   dosing means in said second conduit means for establishing a predetermined rate of admixture, said dosing means including a housing with a first compartment open to said second supply means, a second compartment communicating with said first conduit means and a gas-penetrable partition between said compartments.

6. An apparatus as defined in claim 5 wherein said partition is a diaphragm with a narrow orifice.

7. An apparatus as defined in claim 5 wherein said partition is a thin foil.

8. An apparatus as defined in claim 7 wherein said foil is metallic.

9. An apparatus as defined in claim 8 wherein said foil consists at least in part of palladium.

10. An apparatus as defined in claim 9 wherein said foil also includes silver.

11. An apparatus as defined in claim 5, 6, 7, 8, 10 or 11, further comprising a vacuum pump and valve means for temporarily connecting said vacuum pump to said housing in an initial state of operation prior to the establishment of communication with said first conduit means.

* * * * *